United States Patent
Kumar Rangarajan Sridhar

(10) Patent No.: US 9,928,231 B2
(45) Date of Patent: *Mar. 27, 2018

(54) UNSUPERVISED TOPIC MODELING FOR SHORT TEXTS

(71) Applicant: AT&T Intellectual Property I, L.P., Atlanta, GA (US)

(72) Inventor: Vivek Kumar Rangarajan Sridhar, Morristown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,446

(22) Filed: Jan. 9, 2017

(65) Prior Publication Data

US 2017/0116178 A1    Apr. 27, 2017

Related U.S. Application Data

(63) Continuation of application No. 14/519,427, filed on Oct. 21, 2014, now Pat. No. 9,575,952.

(51) Int. Cl.
   *G06F 17/27* (2006.01)
   *G10L 25/30* (2013.01)
   *H04W 4/14* (2009.01)

(52) U.S. Cl.
   CPC ...... *G06F 17/2715* (2013.01); *G06F 17/2785* (2013.01); *G10L 25/30* (2013.01); *H04W 4/14* (2013.01)

(58) Field of Classification Search
   CPC .................. G06F 17/2715; G06F 17/2785
   USPC .......................................................... 704/9
   See application file for complete search history.

(56) References Cited

U.S. PATENT DOCUMENTS

| | | | |
|---|---|---|---|
| 5,343,537 | A | 8/1994 | Bellegarda et al. |
| 5,644,648 | A | 7/1997 | Bose et al. |
| 5,745,600 | A | 4/1998 | Chen et al. |
| 5,793,189 | A | 8/1998 | Takahashi et al. |
| 5,825,919 | A | 10/1998 | Bloomberg et al. |
| 5,933,525 | A | 8/1999 | Makhoul et al. |
| 6,775,677 | B1 | 8/2004 | Ando |
| 7,853,485 | B2 | 12/2010 | Song et al. |

(Continued)

FOREIGN PATENT DOCUMENTS

| | | |
|---|---|---|
| AU | 737039 B2 | 8/2001 |
| AU | 764561 B2 | 8/2003 |

(Continued)

OTHER PUBLICATIONS

Mikolov, Tomas, et al. "Distributed Representations of Words and Phrases and their Compositionality", arXiv preprint arXiv:1310.4546 (2013).

(Continued)

*Primary Examiner* — Shaun Roberts

(57) ABSTRACT

Topics are determined for short text messages using an unsupervised topic model. In a training corpus created from a number of short text messages, a vocabulary of words is identified, and for each word a distributed vector representation is obtained by processing windows of the corpus having a fixed length. The corpus is modeled as a Gaussian mixture model in which Gaussian components represent topics. To determine a topic of a sample short text message, a posterior distribution over the corpus topics is obtained using the Gaussian mixture model.

20 Claims, 6 Drawing Sheets

(56) References Cited

U.S. PATENT DOCUMENTS

| | | |
|---|---|---|
| 8,027,540 B2 | 9/2011 | Rodriguez et al. |
| 8,077,973 B2 | 12/2011 | Dong |
| 8,111,923 B2 | 2/2012 | Csurka et al. |
| 8,224,092 B2 | 7/2012 | Bressan |
| 8,447,767 B2 | 5/2013 | Ah-pine et al. |
| 8,463,051 B2 | 6/2013 | Perronnin et al. |
| 8,509,537 B2 | 8/2013 | Perronnin et al. |
| 8,533,204 B2 | 9/2013 | Serrano et al. |
| 8,594,385 B2 | 11/2013 | Marchesotti et al. |
| 8,731,300 B2 | 5/2014 | Rodriguez et al. |
| 9,129,227 B1 | 9/2015 | Yee |
| 2007/0010993 A1 | 1/2007 | Banhenko |
| 2008/0069456 A1 | 3/2008 | Perronnin |
| 2009/0204637 A1 | 8/2009 | Li et al. |
| 2009/0254498 A1 | 10/2009 | Gupta |
| 2010/0145808 A1 | 6/2010 | Hilbert |
| 2010/0280985 A1 | 11/2010 | Duchon et al. |
| 2010/0312769 A1 | 12/2010 | Bailey |
| 2011/0072052 A1 | 3/2011 | Skarin |
| 2012/0101965 A1 | 4/2012 | Hennig |
| 2012/0278321 A1 | 11/2012 | Traub et al. |
| 2013/0046759 A1 | 2/2013 | Grady et al. |
| 2013/0097152 A1 | 4/2013 | Sommer |
| 2013/0204885 A1 | 8/2013 | Clinchant |
| 2013/0273976 A1 | 10/2013 | Rao |
| 2014/0249799 A1 | 9/2014 | Yih |
| 2014/0278426 A1 | 9/2014 | Jost |
| 2014/0324864 A1 | 10/2014 | Choe |
| 2014/0337308 A1 | 11/2014 | De Francisci Morales |
| 2015/0178265 A1 | 6/2015 | Anderson |
| 2016/0098987 A1 | 4/2016 | Stolcke |

FOREIGN PATENT DOCUMENTS

| | | |
|---|---|---|
| JP | 2012164008 A | 8/2012 |
| WO | 2014075174 A1 | 5/2014 |

OTHER PUBLICATIONS

Y. Bengio, R. Ducharme, P. Vincent, and C. Jauvin, "A neural probabilistic language model", Journal of Machine Learning Research, 3:1137-1155 (2003).

Y. Bengio, J. Louradour, R. Collobert, and J. Weston, "Curriculum learning", In Proceedings of ICML (2009).

David M. Blei, Andrew Y. Ng, and Michael I. Jordan, "Latent dirichlet allocation", Journal of Machine Learning Research, 3 (2003).

R. Collobert and J. Weston, "A unified architecture for natural language processing: deep neural networks with multitask learning", In Proceedings of ICML (2008).

C. De Marcken, "Unsupervised Language Acquisitiong", Ph.D. thesis, Massachusetts Institute of Technology (1996).

S. Deerwester, S. T. Dumais, G. W. Furnas, T. K. Landauer, and R. Harshman, "Indexing by latent semantic analysis", Journal of the American Society for Information Science, 41 (1990).

J. L. Elman, "Distributed representations, simple recurrent networks, and grammatical structure", Machine Learning, 7(2-3):195-225 (1991).

F. Grezl and P. Fousek, "Optimizing bottle-neck features for LVCSR" In Proceedings of ICASSP, pp. 4729-4732 (2008).

Thomas Hofmann, "Probabilistic latent semantic indexing", In Proceedings of the 22Nd Annual International ACM SIGIR Conference on Research and Development in Information Retrieval (1999).

Liangjie Hong and Brian D. Davison, "Empirical study of topic modeling in twitter", In Proceedings of the First Workshop on Social Media Analytics (2010).

C. Kit and Y. Wilks, "Unsupervised Learning of Word Boundary with Description Length Gain", In Proceedings of Workshop on Computational Natural Language Learning CoNLL (1999).

T. Mikolov, S. Kopecky, L. Burget, J. Cernocky, and S. Khudanpur, "Recurrent neural network based language model", In Proceedings of Interspeech (2010).

T. Mikolov, K. Chen, G. Corrado, and J. Dean, "Efficient estimation of word representations in vector space", In Proceedings of Workshop at ICLR (2013).

D. Ramage, S. Dumais, and D. Liebling, "Characterizing microblogs with topic models", In International AAAI Conference on Weblogs and Social Media (2010).

J. Rissanen, "Modeling by shortest data description" Automatica, 14:465471 (1978).

C. E. Shannon, "A Mathematical Theory of Communication", Bell System Technical Journal, 27:379423 (1948).

S. Sista, R. Schwartz, T. R. Leek, and J. Makhoul, "An algorithm for unsupervised topic discovery from broadcast news stories", In Proceedings of HLT, pp. 110-114 (2002).

J. Turian, L. Ratinov, and Y. Bengio, "Word representations: a simple and general method for semisupervised learning", In Proceedings of ACL (2010).

J. Weng et al., "TwitterRank: finding topic-sensitive influential Twitters", In Proceedings of WSDM (2010).

X. Yan et al., "A biterm topic model for short texts", In Proceedings of WWW Conference (2013).

J. Fleiss, "Measuring nomimal scale agreement among many raters", 76 Psychological Bulletin 378-382 (1971).

D. Mimno et al., "Optimizing semantic coherence in topic models", In Proceedings of Conference in Empirical Methods in Natural Language Processing, pp. 262-272 (2011).

Zhang, Qi, et al., "Continuous Word Embeddings for Detecting Local Text Reuses at the Semantic Level", In Proceedings of SIGIR '14 (2014).

Clinchant, Stephane, and Florent Perronnin, "Aggregating Continuous Word Embeddings for Information Retrieval", Proceedings of Workshop on Continuous Vector Space Models and their Compositionality, ACL 2013 (2013).

Le, Quoc V., and Tomas Mikolov, "Distributed Representations of Sentences and Documents", arXiv preprint arXiv:1405.4053 (2014).

Kågebäck, Mikael, et al., "Extractive Summarization using Continuous Vector Space Models", Proceedings of the 2nd Workshop on Continuous Vector Space Models and their Compositionality at EACL 2014 (2014).

Preotiuc-Pietro, Daniel, "Temporal models of streaming social media data", Dissertation, University of Sheffield (2014).

Gállego, Pablo José Pérez, "Opinion Analysis in Web 2.0." Master Project, Universidad De Oviedo (2012).

| | Language | | | | | | | | | |
|---|---|---|---|---|---|---|---|---|---|---|
| | en | | es | | fr | | pt | | ru | |
| Corpus | #voc | #sents | #voc | #sents | #voc | #sents | #voc | #sents | #voc | #sents |
| Twitter | 8371078 | 178770137 | 5820863 | 74784082 | 1697819 | 14383118 | 1816744 | 22031792 | 2410668 | 16025128 |

| | |
|---|---|
| femaleartist;peopleschoice | jensen;ackles |
| license;expires | phillip;phillips |
| hong;kong | kristein;kreuk |
| fifth;harmony | paris;hilton |
| peanut;butter | hannah;montana |
| los;angeles | darren;criss |
| kendall;jenner | cristiano;ronaldo |
| conflicting;signals | ellie;goulding |
| nina;dobrev | typhoon;haiyan |
| tony;romo | mtvstars;olly;murs |
| whoa;shocking;footage | diy;electronic;projects |
| castle;tvcrimedrama;peopleschoice | allawi;iraq;sovereignty |
| beyonce;malik;sassy | wolfgang;amadeus;mozart |
| iranian;nuclear;program | devil;wears;prada |
| johnny;depp;travels | forgetting;sarah;marshall |
| neil;patrick;harris | kristin;kreuk];scifiactress |
| tape;leaked;1ddaylive | hezbollah;terror;mastermind |

| c7 | c113 | c1 | c3 | c66 |
|---|---|---|---|---|
| epictectus | dexter | ❄ | #nj | conservatives |
| confucius | portlandia | 40° | #ottawa | politicians |
| sophocles | mulan | ❄ | #yyc | constitution |
| aristotle | jarhead | #fwinter | #melbourne | mandate |
| yiddish | starwars | #freezing | #toronto | alp |
| euripides | misfits | degrees | #indy | progressives |
| machiavelli | twilight | #ihatewinter | #vancouver | gop |
| #ultimatequotes | supernatural | blustery | #seattle | government |
| proverb | prometheus | #winterishere | #california | liberal |
| #bookbuzzr | avengers | brrrrr | #colorado | lnp |
| rumi | #thisistheend | #bundleup | #austin | tories |
| voltaire | jumpstreet | #socold | #philadelphia | bho |
| #proverb | simpsons | #hatewinter | #greenwich | propaganda |
| #wednesdaywisdom | sopranos | #toocold | #travelpics | repubs |

| c7 | c113 | c1 | c3 | c66 |
|---|---|---|---|---|
| bertrand_russell | scooby_doo | below_zero | charlotte_obs | political_parties |
| isaac_asimov | inglorious_basterds | mph_winds | #amman_#jo | koch_bros |
| thich_nhat_hanh | pulp_fiction | gusty_winds | photo_courtesy | tax_reform |
| unknown_#quote | the_movies | sub_zero | travel_pics | tony_abbott |
| steven_wright | iron_giant | #snow_#winter | | civil_servants |
| emily_dickinson | casino_royale | icy_roads | | foreign_policy |
| virginia_woolf | pacific_rim | slippery_roads | | term_limits |
| deepak_chopra | boondock_saints | salt_trucks | | fed_govt |
| russian_proverb | duck_dynasty | grey_skies | | sinn_fein |
| thomas_edison | forrest_gump | | | eu_membership |
| author_unknown | cloud_atlas | | | elected_officials |
| groucho_marx | les_mis | | | religious_leaders |
| carl_jung | jungle_book | | | abbott_govt |
| oliver_wendell_holmes | donnie_darko | | | civil_society |

FIG. 7

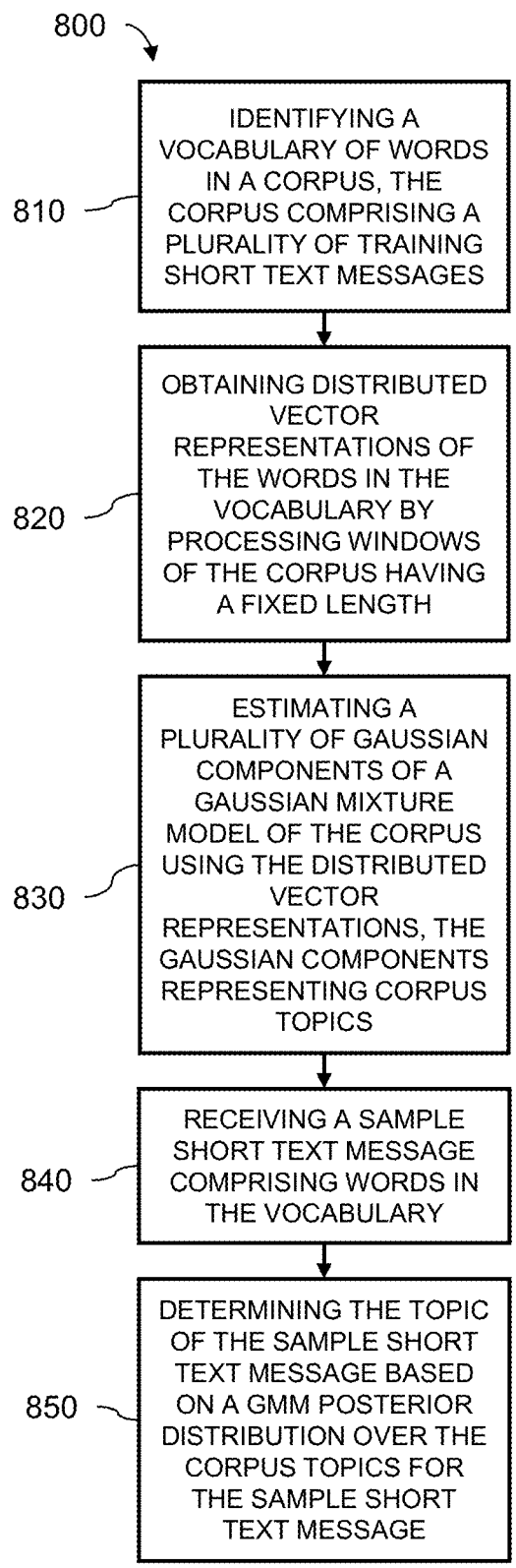

UNSUPERVISED TOPIC MODELING FOR SHORT TEXTS

CROSS-REFERENCE TO RELATED APPLICATIONS

This application is a continuation of co-pending application Ser. No. 14/519,427, entitled "Unsupervised Topic Modeling for Short Texts," filed on Oct. 21, 2014, and issued as U.S. Pat. No. 9,575,952 on Feb. 21, 2017, the contents of which are hereby incorporated by reference herein in their entirety.

TECHNICAL FIELD

The present disclosure relates to the unsupervised modeling and determination of short text topics. More specifically, the disclosure is directed representing topics in a corpus of short texts by creating a Gaussian mixture model from a dense vector distributed representation of each word. The distributed representations are computed by processing the corpus using a sampling window having a length comparable to that of the short texts.

BACKGROUND

One of the fundamental problems in natural language processing (NLP) is to learn meaning (at word, phrase, sentence or discourse level). Often, one would like to learn meaning or semantics in a data-driven fashion, possibly in an unsupervised manner. Deriving meaning from linguistic units has immense benefit in tasks such as information retrieval, machine translation (concept-based) and deeper analysis of texts for various business related decision making or troubleshooting. More recently, semantics have become important to glean meaning from Big Data such as customer reviews, tweets, user comments, etc.

A popular way to infer semantics in an unsupervised manner is to model a document as a mixture of latent topics. Several latent semantic analysis schemes have been used to good success in inferring the high level meaning of documents through a set of representative words (topics). However, the notion of a document has changed immensely over the last decade. Users have embraced new communication and information media such as short messaging service (SMS), Twitter®, Facebook® posts and user comments on news pages/blogs in place of emails and conventional news websites. Document sizes have been reduced from a few hundred words to a few hundred characters while the amount of data has increased exponentially.

There is therefore a need in the art for a technique to create an unsupervised topic model for short texts. There is furthermore a need in the art for a reliable topic model for large numbers of short texts.

There is additionally a need in the art for a technique to reliably identify latent topics in a topic model for large numbers of short texts. The need extends to a technique that is language agnostic.

There is furthermore a need in the art for an unsupervised phrase induction scheme that uses minimum description length to automatically learn phrases.

SUMMARY

The needs existing in the field are addressed by the present disclosure, which relates to the unsupervised modeling of topics in short messages using distributed representations of words.

Exemplary embodiments of the invention feature a method for determining a topic of a sample short text message. The method may be performed by a computer processor. A vocabulary of words is identified in a corpus, the corpus comprising a plurality of training short text messages. Distributed vector representations of the words in the vocabulary are obtained by processing windows of the corpus having a fixed length. A plurality of Gaussian components of a Gaussian mixture model of the corpus are estimated using the distributed vector representations, the Gaussian components representing corpus topics.

A sample short text message comprising words in the vocabulary is then received. The topic of the sample short text message is determined based on a posterior distribution over the corpus topics for the sample short text message, the posterior distribution obtained using the Gaussian mixture model.

The posterior distribution over the corpus topics for the short message may be determined by evaluating:

$$k^* = \arg_{\theta_k} \max p(k) \prod_{i=1}^{N} p(w'_i \mid k)$$

where $k^*$ is a posterior distribution for a topic k, $\theta_k$ denotes the parameters for the $k^{th}$ Gaussian component of the Gaussian mixture model, $w_i'$ is the $i^{th}$ word in the sample short text message and the probabilities $p(k)$ and $p(w_i'|k)$ are obtained from the Gaussian mixture model.

Identifying the vocabulary of words in the corpus may further comprise representing a phrase of words within the corpus by a single code word to minimize a description length of the corpus.

In other embodiments, a tangible computer-readable medium is provided having stored thereon computer readable instructions for determining a topic of a sample short text message, wherein execution of the computer readable instructions by a processor causes the processor to perform operations as set forth above.

Other embodiments feature a message topic trend alert system of a communications network. The system includes at least one interface to the communications network configured for receiving short text messages transmitted within the short message communications network, and at least one processor. The system further includes at least one computer readable storage device having stored thereon computer readable instructions that, when executed by the at least one processor, cause the at least one processor to perform operations for generating an alert based on a message topic trend. The operations include identifying a vocabulary of words in a corpus, the corpus comprising a plurality of training short text messages; obtaining distributed vector representations of the words in the vocabulary by processing windows of the corpus having a fixed length; estimating a plurality of Gaussian components of a Gaussian mixture model of the corpus using the distributed vector representations, the Gaussian components representing corpus topics; receiving a plurality of sample short text messages comprising words in the vocabulary; and determining topics of the sample short text messages based on a posterior distribution over the corpus topics for the sample short text messages, the posterior distribution obtained using the Gaussian mixture model. The operations further comprise identifying a trend in topics of the short text messages, and generating an alert based on the trend.

The respective objects and features of the disclosure may be applied jointly or severally in any combination or sub combination by those skilled in the art.

BRIEF DESCRIPTION OF THE DRAWINGS

The teachings of the present invention can be readily understood by considering the following detailed description in conjunction with the accompanying drawings, in which:

FIG. 4 is a table showing statistics of data used to induce distributed representations of words according to embodiments of the disclosure.

FIG. 5 is a table showing example phrases obtained using unsupervised phrase induction according to embodiments of the disclosure.

FIG. 6 is a table showing terms with highest probability for sample latent topics obtained according to embodiments of the disclosure.

FIG. 7 is a table showing phrases with highest probability for sample latent topics obtained according to embodiments of the disclosure.

FIG. 8 is a flowchart showing operations according to embodiments of the disclosure.

To facilitate understanding, identical reference numerals have been used, where possible, to designate identical elements that are common to the figures.

DETAILED DESCRIPTION OF EXEMPLARY EMBODIMENTS

Introduction

Figure 1:
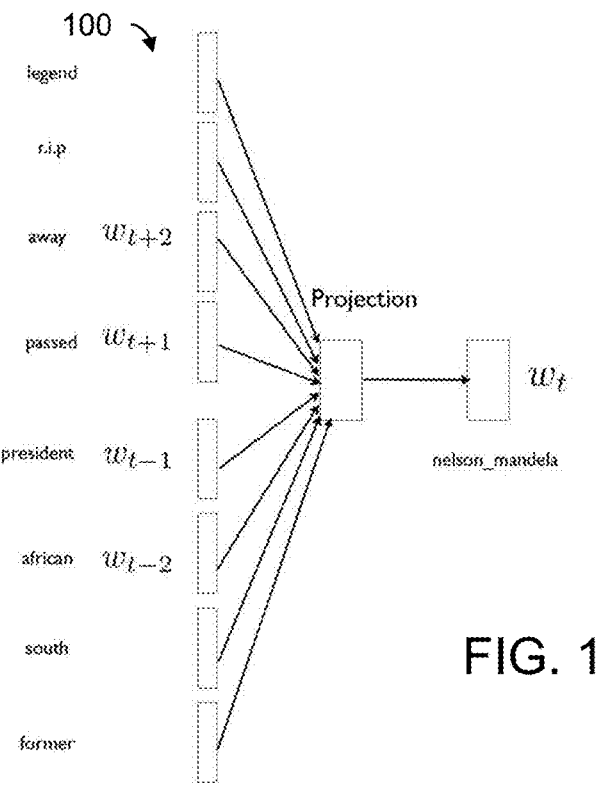
FIG. 1 is a schematic diagram illustrating obtaining distributed representations of words using a continuous bag-of-words architecture according to embodiments of the disclosure.

An unsupervised topic model is disclosed that uses distributed representations of words. The distributed word representations are learned through deep neural networks or linear models represent words in, where D is the dimensionality of the vector space. In embodiments, the low-dimensional semantic vector space represented by the dense word vectors is modeled using Gaussian mixture models (GMMs). The K components of the Gaussian mixture model can be considered as the latent topics that are captured by the model. For short messages, the distributed representations learned over limited context windows have been found to be sufficient in capturing the distributional similarity of words as well as semantics of the message. In comparison with previous approaches to topic modeling, the distribution over documents is completely ignored and instead the entire corpus is considered, thereby eliminating the need for aggregation over short messages. The disclosed framework presented here is unsupervised, language agnostic and scalable.

Various methodologies of semantic analysis have been conventionally used on collections of documents that are typically at least a few hundred words in length. With the recent advent of SMS, Twitter® and Facebook®, several efforts have addressed the application of topic models to short texts. For example, tweets from a single user have been aggregated into documents, from which topics are induced. In another example, a supervised version of latent Dirichlet allocation (LDA) was used to model individual messages.

In contrast with previous approaches that have either modified LDA or modified the input to LDA (by aggregating short messages), the presently disclosed approach works on the entire corpus (e.g., billions of tweets or SMS messages) without any aggregation strategy, and is completely unsupervised. The approach learns distributed representations of words over sufficiently long context windows and subsequently uses Gaussian mixture models to parameterize the vector space represented by the distributed representations.

The presently described technique models a V×D matrix (rows represent the words in a given vocabulary and the columns represent the distributed representations) using a GMM with K mixture components. The framework is inspired by use of bottleneck features obtained from neural networks in hidden Markov model (HMM) based speech recognition, as described in F. Grezl and P. Fousek, Optimizing bottle-neck features for LVCSR, In Proceedings of ICASSP, pp 4729-4732 (2008) (hereinafter "Grezl"), the contents of which is hereby incorporated here in its entirety. All the optimization and parallelization techniques used in HMM-based speech recognition can potentially be used to scale to large text data sets.

Details

Distributed representation of words (also called word embeddings or continuous space representation of words) has become a widely used technique for capturing distributional similarity (lexical, semantic or even syntactic) between words. The basic idea is to represent each word in a vocabulary V with a real-valued vector of some fixed dimension D; i.e., $w_i \in \mathbb{R}^D \forall i-1, \ldots, V$. Improved training techniques and tools in the recent past for representing words in vector space have made it possible to obtain such representations for large vocabularies.

Distributed representations can be induced for a given vocabulary V in several ways. While they are typically induced in the context of a deep neural network framework for a given task, recent work described in T. Mikolov, K. Chen, G. Corrado, and J. Dean, Efficient estimation of word representations in vector space, In Proceedings of Workshop at ICLR (2013) (hereinafter "Mikolov"), the contents of which is hereby incorporated here in its entirety, has also shown that they can also be induced by using simple log-linear models. Since in many practical NLP applications, the distributed representations are learned along with the task (generatively or discriminatively), the word vectors will have some notion of distributional similarity that is task dependent. For example, in a binary sentiment classification task, words representing positive sentiment will be closer in the vector space ($\mathbb{R}^D$) and away from the words denoting negative sentiment. Similarly, in a language model task, words that share similar context will have vector representations that are closer.

Figure 2:
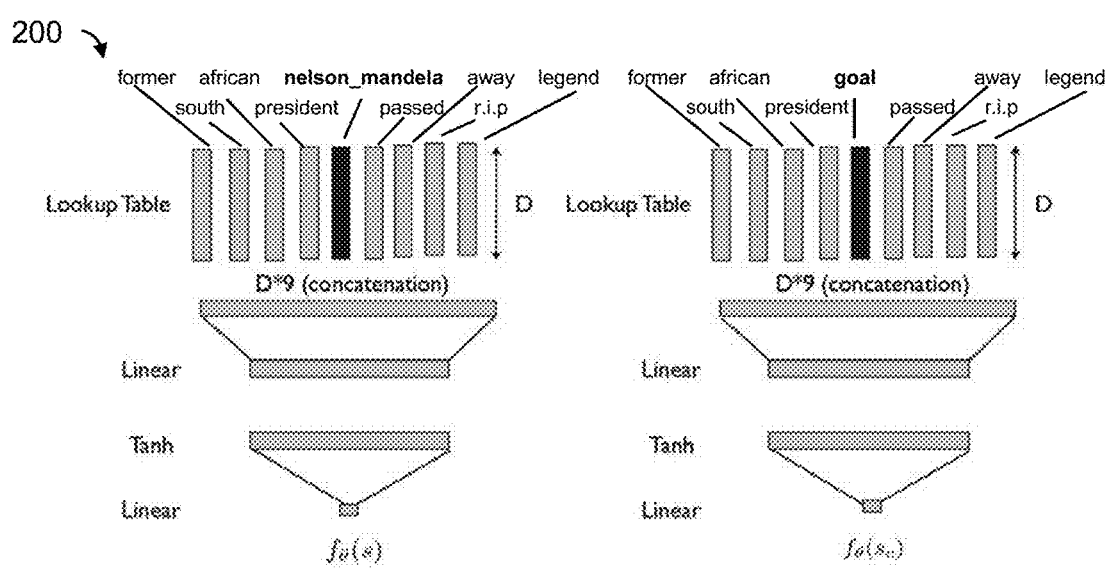
FIG. 2 is a schematic diagram illustrating obtaining distributed representations of words using a deep neural network architecture according to embodiments of the disclosure.

FIGS. 1 & 2 shows two different architectures for inducing distributed representations. In each architecture, an entire tweet can be captured with sufficient context. FIG. 1 shows an architecture 100 for a continuous bag-of-words model (as described in Mikolov). A deep learning architecture 200 for inducing distributed representations in language models is shown in FIG. 2. $\theta$ denotes the parameters of the neural network while s and $s_c$ denote the correct and corrupt windows, respectively. Both frameworks essentially perform a similar function in that the word representations are created based on contextual similarity. One may also use a skip-gram architecture (Mikolov) or a recurrent neural network to obtain word embeddings. An interesting aspect of such models when applied to short social media texts such as Twitter® messages, SMS messages, Facebook® posts, etc., is that with an adequate context window one can learn very reliable distributed word representations over entire sentences. Since the average sentence length for those text media is between 12-16 words, inducing distributed representations over similar length windows can capture the semantic similarity between the words in a message. In the following disclosure, that property is exploited to perform topic modeling for short messages.

A log-linear model is used for inducing the distributed representations using the continuous bag-of-words architecture as shown in FIG. 1. Since the implementation of that architecture was readily available through the word2vec tool available on-line from Google®, that tool was used for inducing the representations. Hierarchical sampling was used for reducing the vocabulary during training, and a minimum count of 5 occurrences for each word was used. One can also use a deep neural network approach such as that shown in FIG. 2 for inducing the representations. The training of those networks, however, is extremely time consuming and, in the present work, it was decided to use the simple log-linear model The framework presented here can work with distributed representations obtained with any methodology (latent semantic indexing, log-linear models, feedforward neural networks, convolutional neural networks, recurrent neural networks, etc.).

A continuous-bag-of-words model (Mikolov) is used in the present disclosure to process all windows of length wlen in a corpus and output a D-dimensional vector $d_i$ for each word $w_i$ in the vocabulary V. Once the set of word embeddings $w_i \rightarrow d_i$, $\forall i \in V$ is obtained, a Gaussian mixture model (GMM) is used to learn a parametric model for the distributed representations. That is based on the use of bottleneck features obtained using neural networks for training HMM-based speech recognition systems, as disclosed by Grezl. A conjecture is made in the present work that the Gaussian mixture model can learn the latent topics by clustering over the distributed representations that are already trained with a semantic similarity objective (positional and contextual similarity). The distributed representations for the vocabulary V can be represented as a V×D matrix where each row represents a word $w_i$ in the vocabulary. If it is chosen to model this data with K Gaussian components, it is necessary to estimate $\mu_k$, $\Sigma_k$, and $p(k|w_i)$ $\forall k \in K$, $w_i \in V$; namely, the means, covariances and mixture weights. The parameters for the $k^{th}$ component are denoted by $\Theta_k$. The standard expectation-maximization (EM) algorithm can be used for Gaussian mixture models to estimate the parameters. Diagonal covariance matrix approximation is used in this work; i.e., $\Sigma_k$, $\forall k \in K$ are diagonal.

Figure 3:
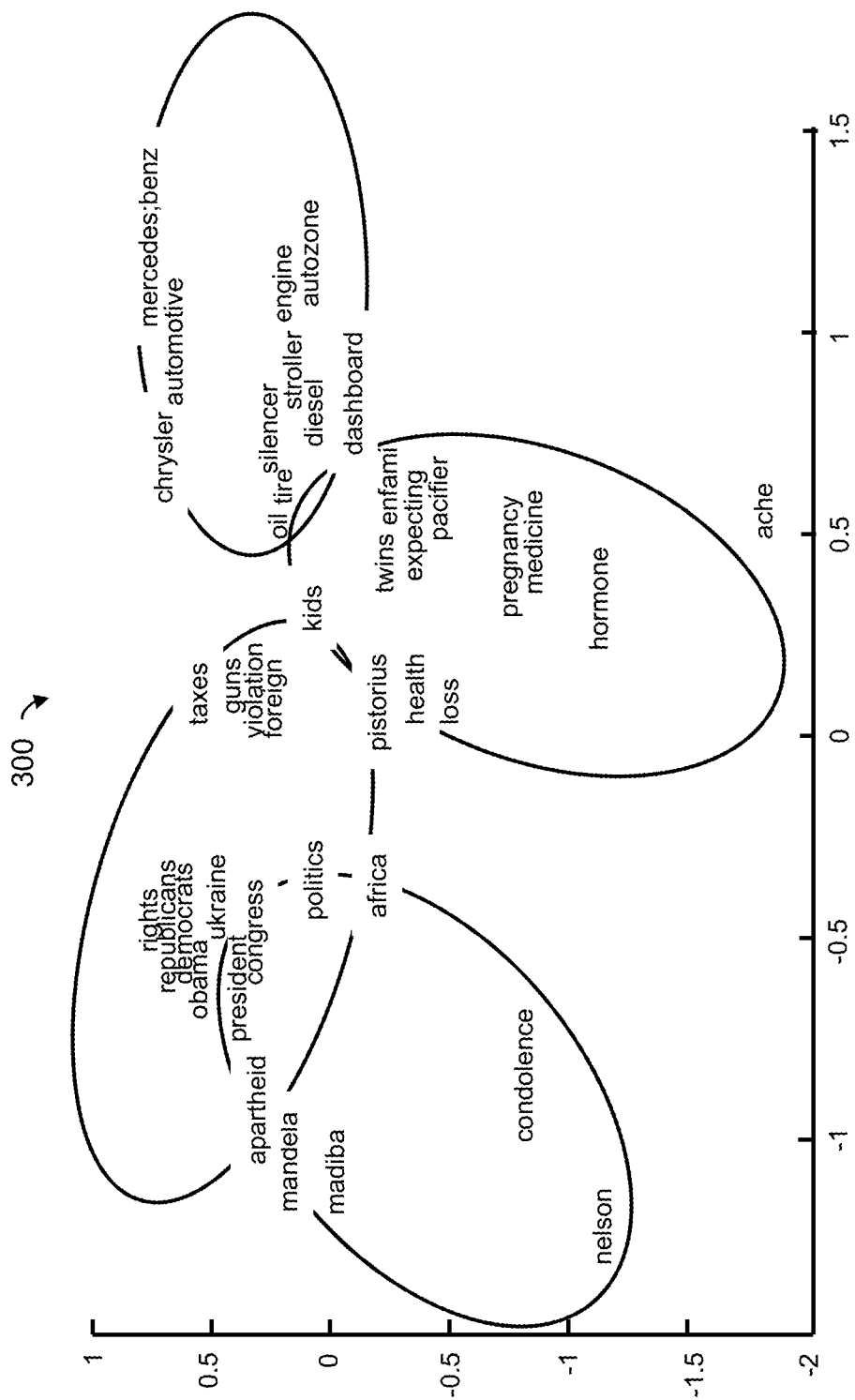
FIG. 3 is a plot showing fitting of a Gaussian mixture model to distributed representations of words according to embodiments of the disclosure.

Given a new sentence $s'=\{w_1', \ldots, w_N'\}$, decoding may be performed in the following way to assign the sentence to a particular topic k or a collection of topics since one can obtain the posterior distribution over the topics for each sentence:

$$k^* = \underset{\Theta_k}{\mathrm{argmax}} p(k | w_1', \ldots, w_N')$$
$$= \underset{\Theta_k}{\mathrm{argmax}} p(w_1', \ldots, w_N' | k) p(k)$$
$$k^* = \underset{\Theta_k}{\mathrm{argmax}} p(k) \prod_{i=1}^{N} p(w_i' | k)$$

where p(k) and $p(w_i'|k)$ are obtained from the Gaussian mixture model. The notion of latent topics in this model is represented by the K components of the GMM. A plot 300, shown in FIG. 3, shows an example of fitting a GMM to distributed representations of words. To create that plot, the dimension of the distributed representations was reduced from 100 to 2 using principal component analysis. Four GMM components were used.

One difference between the presently described approach and previous approaches to topic modeling is that the present approach starts with a dense vector representation for each word in place of a multinomial distribution that is typically learned as part of the topic modeling framework. Another difference is that the present approach does not use the notion of a document since the distributed representations are learned over windows over the entire corpus. An adequate window length can ensure that the bag-of-words model captures all the characteristics in a given message. In one embodiment, the window length approximates the average length of the short messages. In another embodiment, the window length is greater than or equal to the maximum message length. In the following discussion, the latent topic model discussed above is improved by using phrases in place of words. The use of phrases is likely to provide better understanding and interpretation of the topics while reducing the overall number of terms in a given corpus.

Inducing meaningful phrases from text is a difficult task. While syntactic information obtained from chunkers or parsers can aid in extracting phrases, such tools may be difficult to obtain for new languages and are typically domain dependent.

The problem is addressed herein using an unsupervised approach that uses the principle of minimum description length (MDL) to represent a corpus. MDL is described by J. Rissanen, Modeling by shortest data description, Automatica, 14:465471 (1978), the contents of which is incorporated by reference in its entirety herein. While such a scheme has been proposed in previous work, it is utilized here as a holistic treatment of the problem, drawing on its utility towards our topic modeling framework.

The goal is to represent a given corpus with the most efficient code. For example, if the ASCII character set is used as a codebook, the corpus can be represented by the number of characters times 8 bits. This code, however, is far from efficient. In general, the description length of a corpus is defined as the sum of the codebook size and the number of bits used to write out the corpus with the codebook. A smarter codebook can be constructed based on Shannon's coding theory, which proposes that the number of bits used to represent a letter is a function of the log of that letter's frequency in the language.

Let c(w) denote the frequency of a word w in a corpus $\mathcal{C}$ with N words. The probability of the word is then $$p(w) \approx \frac{c(w)}{N}.$$

According to Shannon's theory, the number of bits to code w is $-\log_2(p(w))$. The overall description length (DL) of the corpus can be defined as $$DL(\mathcal{C}) = \sum_{w \in \mathcal{C}} (-c(w)\log_2(p(w)) + b * l(w))$$

where l(w) is the character length of w and b is the number of bits used to represent a character (typically 8).

Suppose adjacent pairs of words are combined and represented with a single codeword. It is possible to save on the description length if the bigram is very common in the corpus; i.e., a single codeword can be used for the bigram in place of two codewords for the constituent unigrams. For example, the bigram democratic convention may occur together so frequently that representing it as a compound word, hence a single codeword, may be beneficial in reducing the DL of the corpus. More formally, given a bigram $w_{i-1}$; $w_i$, the change in DL ($\Delta DL$) can be estimated if the bigram is represented by one codeword instead of two. The following approximation ignores the contribution to the change in description length from the code-book size.

$$\Delta DL(w_{i-1}; w_i) \approx$$
$$-c(w_{i-1}; w_i)\log_2(p(w_{i-1}; w_i)) - c^{new}(w_{i-1})\log_2(p^{new}(w_{i-1})) -$$
$$c^{new}(w_i)\log_2(p^{new}(w_i)) + c(w_{i-1})\log_2(p(w_{i-1})) + c(w_i)\log_2(p(w_i)) +$$
$$\sum_{w \neq w_{i-1}, w_i}(-c(w)\log_2(p^{new}(w)) + c(w)\log_2(p(w)))$$

where $c(w_{i-1}; w_i)$ is the frequency of the bigram $w_{i-1}$; $w_i$, $c^{new}(w_{i-1}) = c(w_{i-1}) - c(w_{i-1}; w_i)$ is the new number of counts for $w_{i-1}$ after adding $w_{i-1}$; $w_i$ to the codebook, $$p^{new}(w_{i-1}) = \frac{c^{new}(w_{i-1})}{N^{new}}$$

and $N^{new} = N - c(w_{i-1}; w_i)$. Similar estimation is performed for $c^{new}(w_i)$.

If a maximum threshold a is set, it is possible to iterate over all bigrams and combine them if the $\Delta DL(w_{i-1}; w_i) < \alpha$. By repeating the process, arbitrary length phrases can be formed. In practice, if one considers a stop word list, the overall number of contiguous bigrams for a sentence with slen words is much smaller than slen−1.

Experimental Results

A 10% random sample from the Twitter® Firehose data access service was acquired for 2 weeks across all languages. As a first step, the tweets were filtered by language code. Since the language code is a property set in the user profile, the language code does not guarantee that all tweets are in the same language. A simple frequency threshold was used for language identification based on language specific word lists obtained from Wiktionary$^{SM}$. Subsequently, some basic clean-up was performed such as replacing usernames, hashtags, web addresses and numerals with generic symbols such as _user_, _hashtags_, _url_and_number_. Finally, all punctuation was removed from the strings and the text was lowercased.

The described experiments were performed on data in English, Spanish, French, Portuguese and Russian. Statistics of the data used to induce distributed representation in each language are presented in the table 400 of FIG. 4. For each of the languages English (en), Spanish (es), French (fr), Portuguese (pt) and Russian (ru), a vocabulary size (#voc) and number of sentences (#sents) is tabulated.

A stop word list was also formed to eliminate extremely common as well as rare words from the topic models. For English, the stop word list comprised of words with a frequency greater than 5 million and less than 5 in the training data. For Spanish, French, Portuguese and Russian, the stop word list comprised of words with frequency greater than 25,000 and less than 5 in the respective training data.

A list of phrases was obtained for the English portion of the corpus using the unsupervised phrase induction scheme. The induction of phrases was limited to a length of 3 and $\Delta DL$ was set to −0.09. The table 500 of FIG. 5 shows some of the phrases automatically induced over the English portion of the Twitter® data. Subsequently, the raw Twitter® data was phrasified (words were compounded) using the dictionary of phrases with greedy matching. The phrase induction was performed for English only.

The text data was subsequently filtered using the stop word list. Low frequency words (less than 4 occurrences) were also randomly replaced with an_UNK_token to keep the vocabulary open. Distributed representations using the continuous bag-of-words log-linear model was used to obtain $w_i \to d_i$, $\forall i \in V$ in each language. The experimentation was directed to different dimensions of distributed representations as well as mixture components.

The tables of terms 600 presented in FIG. 6 show some topics learned by the model and the terms that comprise the topics for a model learned with D=100 and K=200 on English Twitter® data. The terms are ranked by probability for each latent topic, and only the highest probability terms are shown. Each latent topic is represented by a GMM component. The tables of terms 700 shown in FIG. 7 illustrate high probability phrases for the same topics, again learned with D=100 and K=200 on English Twitter® data. Clearly, with a combination of words and phrases, one can comprehend the category of the latent topics in a better fashion. The phrase induction scheme presented here can be applied as a preprocessor for any topic modeling framework.

Unsupervised topic modeling schemes are inherently difficult to evaluate quantitatively. Perplexity of trained models on a held-out set is typically used to objectively evaluate topic models. While, for an unseen held-out set, it is generally hard to estimate perplexity since the topic mixtures are unknown for the held-out documents, the presently described approach learns likelihoods and priors across a large vocabulary. As a result, the absolute perplexity (unknown words are mapped into_UNK_token) of a held-out set can be computed. The perplexity of a held-out set of documents, $C_{test}$, is defined as $$\text{perplexity}(C_{test}) = \exp\left\{-\frac{\sum_{d=1}^{M}\log p(w_d)}{\sum_{d=1}^{M} N_d}\right\}$$

where M is the number of documents (posts or tweets), $w_d$ represents the words in a particular tweet d and $N_d$ is the number of words in tweet d. $p(w_d)$ can be computed from the GMM topic model in the following way:

$$p(w_d) = \prod_{i=1}^{N_d} p(w_i) = \prod_{i=1}^{N_d} \sum_{k=1}^{K} p(k, w_i)$$
$$= \prod_{i=1}^{N_d} \sum_{k=1}^{K} p(w_i \mid k) p(k).$$

Method

A method 800 in accordance with the above disclosure will now be described with reference to FIG. 8. The method is performed by a processor in a system as described below. A vocabulary of words in a corpus is initially identified (operation 810). The corpus may include a plurality of short text messages used in training a model. The corpus may, for example, comprise date obtained from the Twitter® Firehose data access service. As used herein, a "short text message" is a message from a group of messages having an average length of less than 30 words. In one embodiment, the messages have an average text length of between 12 and 16 words.

Distributed vector representations of the words in the vocabulary are obtained (operation 820) by processing windows of the corpus having a fixed length. In embodiments, the length of the windows may approximate an average length of short text messages in the corpus. A plurality of Gaussian components of a Gaussian mixture model of the corpus are estimated (operation 830) using the distributed vector representations. Each of the Gaussian components represents a corpus topic.

A sample short text message comprising words in the vocabulary is then received (operation 840). The topic of the sample short text message is determined (operation 850) based on a posterior distribution over the corpus topics for the sample short text message. The posterior distribution is obtained using the Gaussian mixture model.

System

The presently described arrangement may be implemented in a message topic alert system in which topics of short messages are identified and monitored and, based on the determination of a trend in those topics, an alarm is generated. Such a system is useful in a number of fields including law enforcement, advertising and marketing, news reporting and network management.

Figure 9:
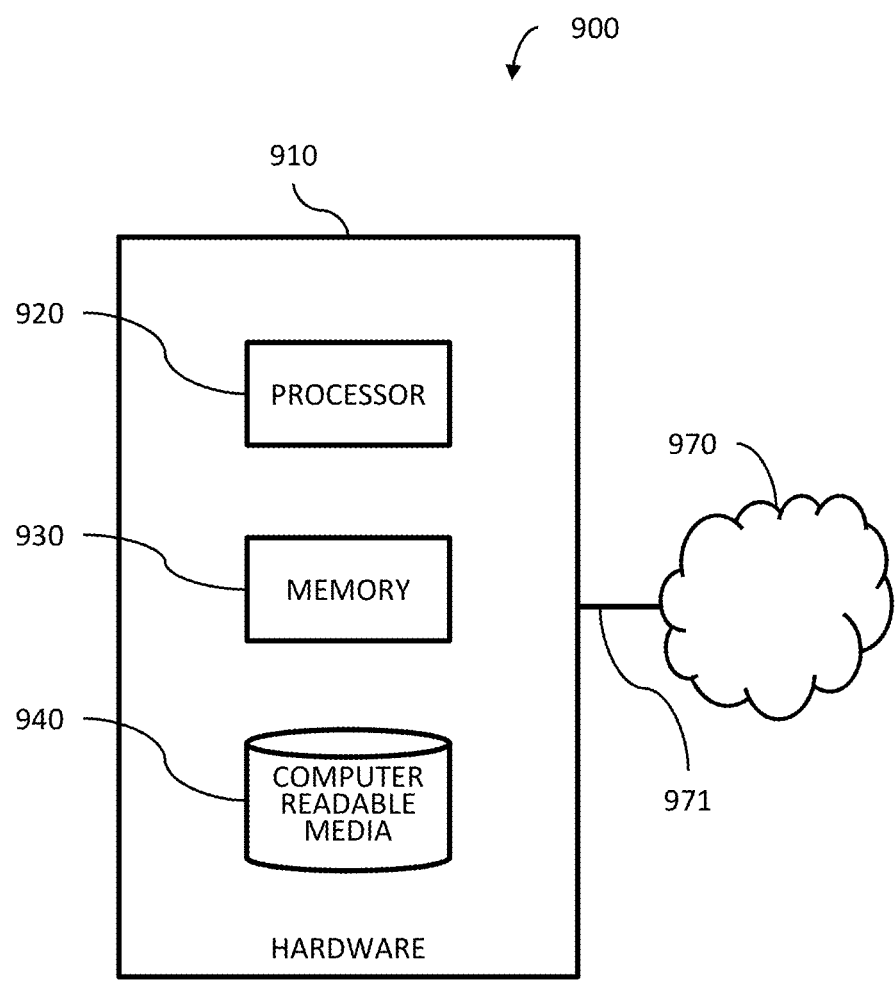
FIG. 9 is a schematic diagram showing a system according to embodiments of the disclosure.

One such system for determining short message topics as described above may be implemented in computer hardware such as the exemplary computing system 900 is shown in FIG. 9.

A computing apparatus 910 may be a mainframe computer, a desktop or laptop computer or any other device or group of devices capable of processing data. The computing apparatus 910 receives data from any number of data sources that may be connected to the apparatus. For example, the computing apparatus 910 may receive input from a communications network 970 such as a wireless data network, or the Internet, via a communications network interface 971.

The computing apparatus 910 includes one or more processors 920 such as a central processing unit (CPU) and further includes a memory 930. The processor 920 is configured using software according to the present disclosure.

The memory 930 functions as a data memory that stores data used during execution of programs in the processor 920, and is also used as a program work area. The memory 930 may also function as a program memory for storing a program executed in the processor 920. The program may reside on any tangible, non-volatile computer-readable media 940 as computer readable instructions stored thereon for execution by the processor to perform the operations.

Generally, the processor 920 is configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude propagated signals, which are not tangible and are not non-transitory. Cached information is considered to be stored on a computer-readable medium. Common expedients of computer-readable media are well-known in the art and need not be described in detail here.

CONCLUSION

The framework presented herein works on large amounts of raw short texts without the need for any aggregation strategy. For media such as Twitter®, Facebook® or SMS, aggregation over users or location is not a good strategy since the interests of users is diverse and can change quickly. While topic modeling schemes such as pLSA and LDA need modifications when applied to short texts and messages, the presently described approach is not confounded with the problem of devising aggregation strategies. It is expected that even for longer documents, applying the presently described scheme at the sentence level can be used to accrue topics over the document. The bottleneck is mainly due to the span of windows that one can use to learn reliable distributed representations of words. For a very large context window such as 20 or 30 words, one will require huge amounts of data. That will become possible in the future with ever increasing data availability.

In the present disclosure, a log-linear model was used for learning distributed representations of words. The scheme, however, can work with distributed representations obtained by neural networks or latent semantic indexing. The key requirement for distributed representations to work with the disclosed GMM framework is that they need to represent good partitioning of semantic concepts in the vector space $\mathbb{R}^D$, where D is the dimensionality of the vector space. For distributed representations learned with a language modeling approach, the semantic vector space is expected to cluster contextually similar terms. On the other hand, representations induced in a classification setting (e.g., sentiment classification) are expected to cluster terms representative of the class labels (e.g., positive, negative and neutral sentiment).

The GMM estimation in this work was simplified under the assumption of diagonal covariance matrices for the components. It is believed that the performance can be further improved with full covariance matrices at the cost of computational overhead involved in the Cholesky decomposition. However, the diagonal covariance assumption improves training time as the GMM parameter estimation can be parallelized.

For short texts, the likelihood of a message containing more than 2 or 3 topics is quite low. The decoding scheme presented in this work can obtain a complete posterior distribution over all topics (GMM components) for each message. It has been found, however, that a large proportion of messages (over 80%) contain only one topic; i.e., the posterior distribution peaks for a particular GMM component. The presently described scheme can be used for a variety of monitoring tasks such as detection of offensive posts, removal of adult content, advertisement detection, etc., since such posts are all clustered together.

The unsupervised phrase induction scheme using minimum description length is extremely good at automatically discovering named entities. The named entities obtained by the procedure can be used as gazetteers for several NLP tasks. The framework can obtain arbitrary length phrases by repeating the phrase induction procedure over multiple runs. In practice, it has been found that after removal of stop words in a sentence, the number of contiguous bigrams is far fewer than the length of the sentence. Hence, it is more appropriate for discovering meaningful phrases of length between 2 and 5. By combining the topic modeling scheme and phrase induction, one can automatically categorize named entities into several categories; e.g., movies, travel destinations, literary authors, etc.

A large stop word list was used to filter out extraneous tokens from Twitter® data. The size and selection of the stop word list can be determined based on the domain and vocabulary size of the data. In general, removing the very high and very low frequency words is suitable for the present approach. Since the unsupervised phrase induction scheme is not n-gram count based, phrases can be obtained that may occur with very low frequency in the training data. The presently described stop word list excludes such phrases.

In sum, a novel unsupervised topic modeling framework was presented for short texts that uses distributed representations of words. That framework models the low-dimensional semantic vector space represented by the dense word vectors, using Gaussian mixture models. By learning representations over sufficiently long context windows, it has been found that one can learn robust word embeddings that can capture the semantics of entire short messages. The work presented here was inspired by the use of deep learning in HMM-based speech recognition and one can potentially use all the optimization techniques used to estimate GMMs over large datasets (thousands of hours of speech) for modeling large amounts of text. Also presented is an unsupervised phrase induction scheme that uses the principle of minimum description length to automatically acquire phrases. The experimental results indicate that the scheme can reliably learn latent topics and can be used to categorize short messages with high fidelity. The scheme is language agnostic and the utility of the scheme was demonstrated in English, Spanish, French, Portuguese and Russian.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A method for determining topics of short text messages, comprising:
   by a computer, obtaining distributed vector representations of words in a vocabulary identified in a corpus comprising a plurality of training short text messages, the distributed vector representations being obtained by processing windows of the corpus having a context window fixed length;
   by the computer, estimating a plurality of Gaussian components of a Gaussian mixture model of the corpus using the distributed vector representations and using bottleneck features obtained using neural networks, the Gaussian components representing corpus topics;
   by the computer, receiving a sample short text message comprising a subset of the words in the vocabulary; and
   by the computer, determining a topic of the sample short text message based on a posterior distribution over the corpus topics for the sample short text message, the posterior distribution obtained using the Gaussian mixture model.

2. The method of claim 1, wherein the training short text messages have a maximum message length, and the context window fixed length is greater than or equal to the maximum message length.

3. The method of claim 1, wherein obtaining distributed vector representations of the words in the vocabulary further comprises applying a continuous bag of words model to process the windows of the corpus.

4. The method of claim 3, wherein applying a continuous bag of words model further comprises using a log-linear model.

5. The method of claim 1, wherein obtaining distributed vector representations of the words in the vocabulary further comprises applying a methodology to process the windows of the corpus, the methodology being selected from a group of methodologies consisting of deep neural network, latent semantic indexing, log-linear model, feedforward neural network, convolutional neural network and recurrent neural network.

6. The method of claim 1 wherein the vocabulary is reduced using hierarchical sampling.

7. The method of claim 6 wherein the hierarchical sampling eliminates words having fewer than five occurrences.

8. The method of claim 1 wherein the plurality of training short text messages has an average text length of between 12 and 16 words.

9. The method of claim 1 wherein estimating the plurality of Gaussian components further comprises estimating means, covariances and mixture weights for each Gaussian component using an expectation-maximization algorithm.

10. The method of claim 9 wherein the covariances are estimated using a covariance matrix approximation wherein the covariances are diagonal matrices.

11. The method of claim 1 wherein the posterior distribution over the corpus topics for the short message is determined by evaluating:

$$k^* = \arg_{\theta_k} \max p(k) \prod_{i=1}^{N} p(w_i' \mid k)$$

where k' is a posterior distribution for a topic k, $\theta_k$ denotes parameters for the $k^{th}$ Gaussian component of the Gaussian mixture model, $w_i'$ is the $i^{th}$ word in the sample short text message and the probabilities p(k) and p($w_i'$|k) are obtained from the Gaussian mixture model.

12. The method of claim 1, wherein the vocabulary of words in the corpus is identified by representing a phrase of words within the corpus by a single code word to minimize a description length of the corpus.

13. A message topic trend alert system of a communications network, comprising:
at least one interface to the communications network configured for receiving short text messages transmitted within the communications network;
at least one processor; and
at least one computer readable storage device having stored thereon computer readable instructions that, when executed by the at least one processor, cause the at least a one processor to perform operations for generating an alert based on a message topic trend, comprising:
obtaining distributed vector representations of words in a vocabulary identified in a corpus comprising a plurality of training short text messages, the distributed vector representations being obtained by processing windows of the corpus having a context window fixed length using a continuous bag of words model;
estimating a plurality of Gaussian components of a Gaussian mixture model of the corpus using the distributed vector representations and using bottleneck features obtained using neural networks, the Gaussian components representing corpus topics;
receiving a plurality of sample short text messages comprising a subset of the words in the vocabulary;
determining topics of the sample short text messages based on a posterior distribution over the corpus topics for the sample short text messages, the posterior distribution obtained using the Gaussian mixture model;
identifying a trend in topics of the short text messages; and
generating an alert based on the trend.

14. The system of claim 13, wherein the short text messages have a maximum message length, and the context window fixed length is greater than or equal to the maximum message length.

15. The system of claim 13, wherein the short text messages have an average message length, and the context window fixed length approximates the average message length.

16. The system of claim 13, wherein using a continuous bag of words model further comprises using a log-linear model.

17. The system of claim 13 wherein the vocabulary is reduced using hierarchical sampling.

18. The system of claim 13 wherein estimating the plurality of Gaussian components further comprises estimating means, covariances and mixture weights for each Gaussian component using an expectation-maximization algorithm.

19. The system of claim 13, wherein the vocabulary of words in the corpus is identified by representing a phrase of words within the corpus by a single code word to minimize a description length of the corpus.

20. A tangible computer-readable medium having stored thereon computer readable instructions for determining topics of short text messages, wherein execution of the computer readable instructions by a processor causes the processor to perform operations comprising:
obtaining distributed vector representations of words in a vocabulary identified in a corpus comprising a plurality of training short text messages, the distributed vector representations being obtained by processing fixed-length windows of the corpus;
obtaining bottleneck features using neural networks;
estimating a plurality of Gaussian components of a Gaussian mixture model of the to corpus using the distributed vector representations and using the bottleneck features, the Gaussian components representing corpus topics;
receiving a sample short text message comprising a subset of the words in the vocabulary; and
determining a topic of the sample short text message based on a posterior distribution over the corpus topics for the sample short text message, the posterior distribution obtained using the Gaussian mixture model.

* * * * *